(12) United States Patent
Nakao

(10) Patent No.: US 8,379,744 B2
(45) Date of Patent: *Feb. 19, 2013

(54) RADIO APPARATUS

(75) Inventor: Seigo Nakao, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,533

(22) Filed: Nov. 21, 2011

(65) Prior Publication Data

US 2012/0128094 A1     May 24, 2012

Related U.S. Application Data

(62) Division of application No. 11/476,140, filed on Jun. 28, 2006, now Pat. No. 8,116,389.

(60) Provisional application No. 60/694,259, filed on Jun. 28, 2005.

(51) Int. Cl.
    *H04K 1/10* (2006.01)
(52) U.S. Cl. ........ 375/260; 375/146; 375/147; 375/267; 375/295; 375/316
(58) Field of Classification Search ................. 375/146, 375/147, 260, 267, 295, 316; 370/203, 204, 370/205, 206, 207, 208, 209, 210; 455/59
    See application file for complete search history.

(56) References Cited

U.S. PATENT DOCUMENTS

| | | | |
|---|---|---|---|
| 7,039,412 B2 | 5/2006 | Sandhu et al. | |
| 7,599,332 B2 | 10/2009 | Zelst et al. | |
| 8,116,389 B2 * | 2/2012 | Nakao | 375/260 |
| 2005/0152314 A1 | 7/2005 | Sun et al. | |
| 2005/0233709 A1 | 10/2005 | Gardner et al. | |
| 2006/0193340 A1 | 8/2006 | Jones et al. | |

FOREIGN PATENT DOCUMENTS

| | | |
|---|---|---|
| JP | 2006-022169 A | 1/2006 |
| WO | WO 2005/006700 A1 | 1/2005 |
| WO | WO 2005/041441 A1 | 5/2005 |

OTHER PUBLICATIONS

A. Huebner et al., "A Simple Space-Frequency Coding Scheme with Cyclic Delay Diversity for OFDM," The Institution of Electrical Engineers, IEE, 2003, pp. 106-110.
Japanese Notification of Reason(s) for Refusal, w/ English translation thereof, issued in Japanese Patent Application No. JP 2006-022169 dated Mar. 8, 2011.
Coleri, Sinem et al.: "Channel Estimation Techniques Based on Pilot Arrangement in OFDM Systems," IEEE Transactions on Broadcasting, vol. 48, No. 3, Sep. 2002, pp. 223-229.

* cited by examiner

*Primary Examiner* — Dhaval Patel
(74) *Attorney, Agent, or Firm* — DC Patent Lawyers, PLLC

(57) ABSTRACT

A control unit generates packet signals to be transmitted. The control unit uses either a first packet format, where a second known signal defined by a second radio communication system different from a first radio communication system is assigned anterior to a first known signal defined by the first radio communication system, or a second packet format, where the first known signal is assigned in an anterior part. Subcarriers to be used in the first known signal contain subcarriers to be used in the second known signal, and the first known signal and the second known signal are defined by different values.

5 Claims, 6 Drawing Sheets

[![US 8,379,744 B2]

RADIO APPARATUS

RELATED APPLICATIONS

This application is a Divisional of U.S. application Ser. No. 11/476,140, filed on Jun. 28, 2006, now U.S. Pat. No. 8,116,389 claiming priority of United States Provisional Application No. 60/694,259, filed on Jun. 28, 2005, the entire contents of each of which are hereby incorporated by reference.

BACKGROUND OF THE INVENTION

1. Field of the Invention

The present invention relates to radio apparatuses, and it particularly relates to a radio apparatus using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The burst signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a burst signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", IEEE Transactions on broadcasting, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of a plurality of packets is called "stream" and the unit of a plurality of streams together or each thereof is called "packet signal"). That is, streams up to the maximum number of antennas are set for the communications between the transmitting apparatus and the receiving apparatus so as to improve the data transmission rates. Moreover, combining this MIMO system with a technique such as the OFDM modulation scheme results in a higher data transmission rate. In this MIMO system, too, the known signal is generally assigned in a header portion. However, since the packet signal is formed by a plurality of streams, the known signals need to be defined by taking the relations therebetween into account.

SUMMARY OF THE INVENTION

The present invention has been made in view of the foregoing circumstances and a general purpose thereof is to provide a radio apparatus that uses known signals suitable for multiple streams.

In order to solve the above problems, a radio apparatus according to a preferred embodiment of the present invention includes: a transmitter which transmits a packet signal using a plurality of subcarriers; and a generation unit which generates a packet signal to be transmitted from the transmitter, wherein the generation unit uses either a first packet format, where a second known signal defined by a second radio communication system different from a first radio communication system is assigned anterior to a first known signal defined by the first radio communication system, or a second packet format, where the first known signal is assigned in an anterior part, and wherein subcarriers to be used in the first known signal contain subcarriers to be used in the second known signal, and the first known signal and the second known signal are defined by different values.

According to this embodiment, the packet format is automatically detected and thereby the control signal is no longer required. As a result, the known signals suitable for the multiple streams can be used.

In the generation unit, the first known signal and the second known signal may be so defined that a correlation between them becomes small. In such a case, since the respective values of the first known signal and the second known signal are so defined that the correlation between them becomes small, the packet format can be detected by correlation processing.

The subcarriers to be used in the first known signal may contain subcarriers other than the subcarriers to be used in the second known signals. In such a case, since the respective values of the first known signal and the second known signal are so defined that the correlation between them becomes small, the packet format can be detected by correlation processing.

The packet signal that the transmitter shall transmit is formed by a plurality of streams, and the generation unit may assign the first known signal in which a cyclic time shifting is executed with a shift amount being varied across a plurality of streams. In such a case, the cyclic time shifting is executed while the shift amount is being varied, so that the correlation among a plurality of streams can be reduced.

Another preferred embodiment according to the present invention relates also to a radio apparatus. This apparatus comprises: a receiver which receives a packet signal that uses either a first packet format, where a second known signal defined by a second radio communication system different from a first radio communication system is assigned anterior to a first known signal defined by the first radio communication system, or a second packet format, where the first known signal is assigned in an anterior part; a correlation unit which outputs a first correlation value by computing correlation between the packet signal received by the receiver and the first known signal and which outputs a second correlation value by computing correlation between the packet signal received by the receiver and the second known signal; and a specifying unit which identifies whether a packet format used in the received packet signal is a first format or second format, based on the first correlation value and the second correlation value computed by the correlation unit. In the packet signal to be received by the receiver, subcarriers to be used in the first known signal contain subcarriers to be used in the second known signal.

According to this embodiment, the packet format is automatically detected and therefore the use of control signals is eliminated. As a result, the known signals suitable for the multiple streams can be used.

Still another preferred embodiment according to the present invention relates also to a radio apparatus. This apparatus includes: a transmitter which transmits a packet signal, using a plurality of subcarriers, which is composed of a plurality of streams; and a generation unit which generates a packet, to be transmitted from the transmitter, where a known signal is assigned, wherein while, across subcarriers to be used by the known signal, a value of known signal in one of the plurality of streams is being rotated by a rotation amount multiplied by an integral multiple of a phase value defined to be a different value per stream, the generation unit defines known signals in the other streams.

According to this embodiment, the known signals in the other streams are defined while the value of known signal in one of the plurality of streams is being rotated. Thus, the correlation among a plurality of streams can be reduced.

The number of streams in the packet signal transmitted by the transmitter is four or less, and the generation unit allocates to each of the plurality of streams, as a phase value, a phase value selected from among 0, $\pi/2$, $\pi$ and $3\pi/2$ in such a manner that the selected phase value differs for each stream. In such a case, the phase values on which the rotation values are based are set at intervals of $\pi/2$. As a result, the complex multiplier is no longer required.

The known signal assigned in the packet signal generated by the generation unit contains a known signal for use with timing estimation and a known signal for use with channel estimation, and a rotation amount for the known signal for use with timing estimation and the known signal for use with channel estimation may be obtained in a manner that a subcarrier having an effective value is multiplied by an integral multiple of phase value. In such a case, the phase value, based on which the rotation amount is derived, is set to the same value for the known signal for timing and the known signal for channel estimation in each stream, thereby simplifying the processing.

Still another preferred embodiment according to the present invention relates also to a radio apparatus. This apparatus radio apparatus comprises: a receiver which receives packet signals, using a plurality of subcarriers, which are composed of a plurality of streams; and a processing unit which processes the packet signal of a plurality of streams received by the receiver. A known signal and data are assigned respectively in the packet signals of a plurality of streams, and while, across subcarriers to be used by the known signals, a value of known signal in one of the plurality of streams is being rotated by a rotation amount multiplied by a predetermined phase value, known signals in the other streams are defined, and the processing unit includes: a means which derives channel characteristics corresponding respectively to a plurality of streams, from the packet signals of a plurality of streams received by the receiver and a known signal in one of a plurality of streams; and a means which respectively demodulates data assigned in the packet signals of a plurality of streams, by rotating the channel characteristics associated with said streams, in accordance with rotation amounts corresponding to known signals in the other streams.

According to this embodiment, since the derived channel characteristics are rotated and then used for a demodulation processing, the know signal contained in a stream undergoes a rotation. Thus, even if data has not undergone a rotation, said data can be demodulated.

Data may be composed of a plurality of streams. A known signal may be composed of a plurality of streams. A control signal may be composed of a plurality of streams.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
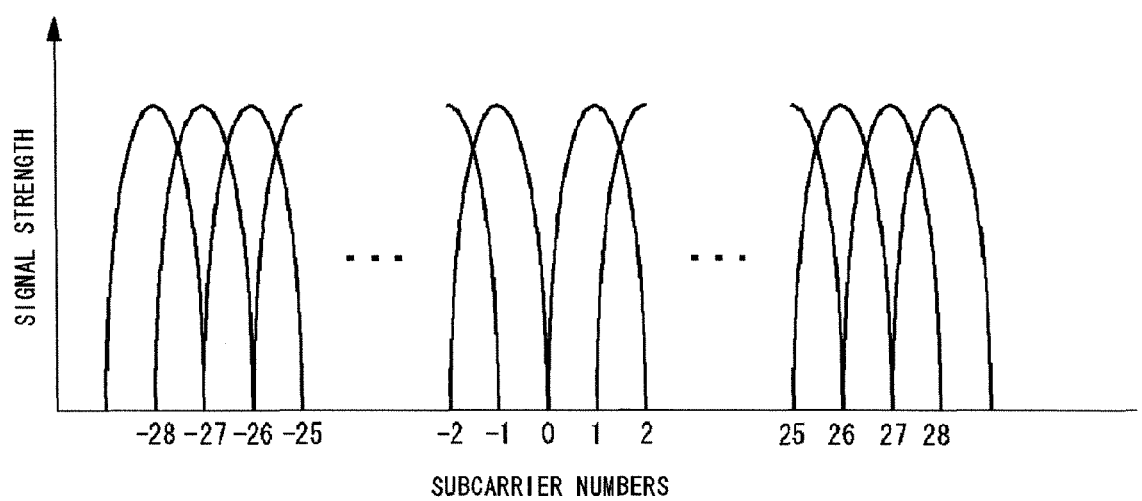
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

Before describing the present invention in detail, an outline of the present invention will be described first. Embodiments according to the present invention relates to a MIMO system comprised of at least two radio apparatuses. At predetermined timings, one of the radio apparatuses corresponds to a transmitting side (hereinafter referred to as "transmitting apparatus") and the other thereof corresponds to a receiving side (hereinafter referred to as "receiving apparatus"). The transmitting apparatus transmits packets formed by a plurality of streams but assigns respectively to them known signals for use with timing estimation (hereinafter referred to as "STF") and those for use with channel estimation (hereinafter referred to as "LTF"). Now, according to the present embodiments, STF and LTF are defined as known signals suitable for a MIMO system, in the following manner.

First, STF is defined as follows. Assume that, as packet formats transmitted from a transmitting apparatus, two kinds of them are defined here. First kind of packet format is a packet format where STF compatible with a MIMO system is assigned in a header portion thereof, and will be referred to as "first format" hereinafter. The other kind of packet format is a packet format where STF compatible with a radio apparatus which is not MIMO system (hereinafter referred to as "legacy system") is assigned anterior to the STF, and this other kind of packet format will be referred to as "second format". In order that a receiving apparatus can automatically detect whether a packet is the first format or second format when the receiving apparatus receives the packet, the transmitting apparatus sets values for L-STF and STF so that the correlation between L-STF and STF is small.

Next, LTF is defined as follows. To facilitate explanation, assume that the number of streams is "4". LTFs assigned respectively in four streams have undergone a cyclic time shift, and a time shift amount for each of four streams is defined based on an inverse Fourier transform unit. The shift amount is defined for four streams as "0", "inverse Fourier transform unit×1/4", "inverse Fourier transform unit×1/2" and "inverse Fourier transform unit×3/4", respectively. Explaining in terms of the frequency domain, predetermined phase amounts of "0", "π/2", "π" and "3π/4" are associated to the four streams, respectively. And the integral multiple of an associated phase value is multiplied in units of subcarrier so as to determine a rotation amount in units of subcarrier. The aforementioned shift amount corresponds to an operation in which LFT corresponding to one of a plurality of streams is rotated by the thus determined rotation value. Phase rotation such as this does not require any multiplier, thus simplifying the processing.

STF and LTF have the following relations. It is assumed herein that contiguous subcarriers are used for LTF whereas discrete subcarriers are used for STF. That is, STF uses one of four subcarriers. The transmitting apparatus defines the equal phase values for between subacarriers where STF is used and those where LTF is used. That is, in streams that contain LTF in which the phase amount of "π/2" is defined, the phase of "π/2" is also defined in STF. By implementing such a structure as this, the same processing can be performed on both STF and LTF.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, in a legacy system, 52 subcarriers, namely, subcarrier numbers "−26" to "26" are defined. One example of legacy systems is a wireless LAN complying with the IEEE802.11a standard.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to 1/2, 3/4 and so forth. The number of data to be transmitted in parallel is set variably. The data are transmitted as burst signals and each of burst signals to be transmitted in parallel is called "stream" herein. As a result thereof, since the mode of modulation scheme and the values of coding rate and the number of streams are set variably, the data rate is also set variably. It is to be noted that the "data rates" may be determined by arbitrary combination of these factors or by one of them.

Figure 2:
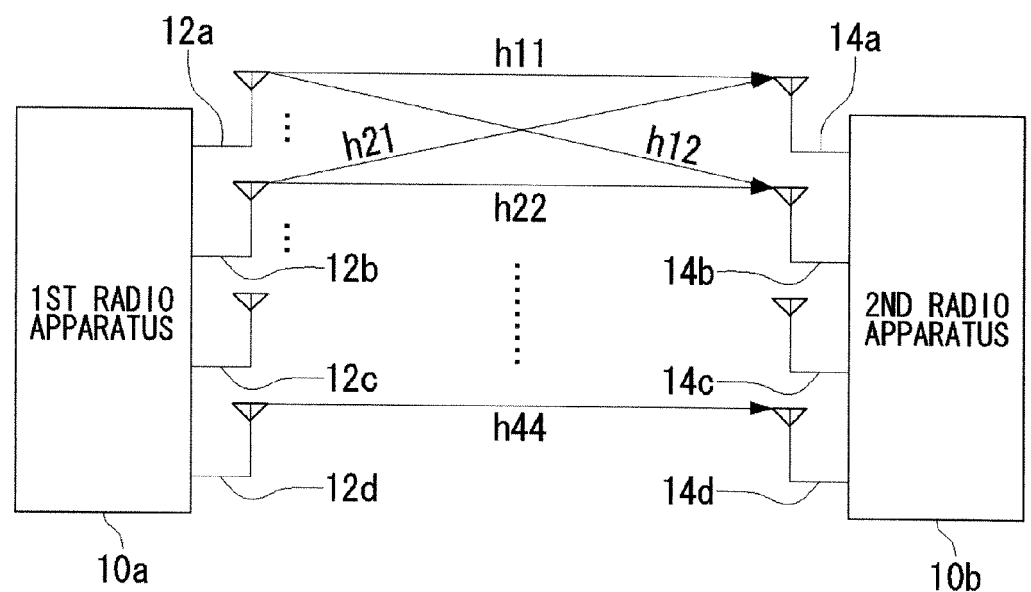
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". One of the first radio apparatus 10a and the second radio apparatus 10b corresponds to a transmitting apparatus, whereas the other thereof corresponds to a receiving apparatus. Also, one of the first radio apparatus 10a and the second radio apparatus 10b may correspond to a base station apparatus, whereas the other thereof may correspond to a terminal apparatus.

Before describing a structure of the communication system 100, an outline of a MIMO system will be explained first. Assume herein that data are being transmitted from the first radio apparatus 10a to the second radio apparatus 10b. The first radio apparatus 10a transmits respectively data of a plurality of streams from the first antenna 12a to fourth antenna 12d, respectively. As a result, the data rate becomes higher. The second radio apparatus 10b receives the data of a plurality of streams by the first antenna 14a to fourth antenna 14d. The second radio apparatus 10b separates the received signals by adaptive array signal processing and demodulates independently the data of a plurality of streams. Since the number of antennas 12 is "4" and the number of antennas 14 is also "4" here, the number of combinations of channels between the antennas 12 and the antennas 14 is "16". The channel characteristic between from the ith antenna $12i$ to the jth antenna $14j$ is denoted by $h_{ij}$. In FIG. 2, the channel characteristic between the first antenna 12a and the first antenna 14a is denoted by $h_{11}$, that between the first antenna 12a and the second antenna 14b by $h_{12}$, that between the second antenna 12b and the first antenna 14a by $h_{21}$, that between the second antenna 12b and the second antenna 14b by $11_{22}$, and that between the fourth antenna 12d and the fourth antenna 14d by $h_{44}$. For the clarity of illustration, it is omitted to show the other channels in FIG. 2.

A frequency-domain signal as shown in FIG. 1 is expressed by $S_{-26, 26}$, where the subscript indicates the subcarrier number. Using such notation as this, L-STF is expressed as in the following Equation (1).

$$S_{-26,26} = \text{sqrt}(13/6)\{0,0,1+j,0,0,0,-1-1j,0,0,0,1+j0,0,\\
0,-1-j,0,0,0,-1-j,0,0,0,1+j,0,0,0,0,0,0,-1-j,0,\\
0,0,-1-j,0,0,0,1+j,0,0,0,1,+j,0,0,0,1,+j,0,0,0,1j,0,\\
0\} \quad (1)$$

where "1+j" indicates a signal point of STF which has been subjected to QPSK modulation.

Problems posed when L-STF is transmitted from the first antenna 12a and the second antenna 12b of FIG. 2, respectively, will be described here. Suppose that a signal transmitted from the first antenna 12a is denoted by $S_1(t)$, a second signal transmitted from the second antenna 12b by $S_2(t)$, and noise is denoted by $n_1(t)$ and $n_2(t)$. Then $X_1(t)$ which is a signal received by the first antennas 14a and $X_2(t)$ which is a signal received by the second antennas 14b will be expressed by the following Equation (2):

$$X_1(t) = h_{11}S_1(t) + h_{21}S_2(t) + n_1(t)$$

$$X_2(t) = h_{12}S_1(t) + h_{22}S_2(t) + n_2(t) \quad (2)$$

The strength, in a predetermined cycle, of signals received by the first antenna 14a is expressed by the following Equation (3).

$$\sum |X_1(t)|^2 = \sum X_1(t)X_1^*(t) \quad (3)$$

-continued $$= \sum \{h_{11}S_1(t) + h_{21}S_2(t) + n_1(t)\}$$
$$\{h_{11}^*S_1^*(t) + h_{21}^*S_2^*(t) + n_1^*(t)\}$$
$$= h_{11}h_{11}^* \sum S_1(t)S_1^*(t) + h_{21}h_{21}^* \sum S_2(t)S_2^*(t) +$$
$$h_{11}h_{21}^* \sum S_1(t)S_2^*(t) + h_{11}^*h_{21} \sum S_1^*(t)S_2(t) +$$
$$h_{11} \sum S_1(t)n_1^*(t) + h_{21} \sum S_2(t)n_1^*(t) +$$
$$h_{11}^* \sum S_1^*(t)n_1 + h_{21}^* \sum S_2^*(t)n_1(t) +$$
$$\sum n_1(t)n_1^*(t)$$

Using the relations $\Sigma S_1^*(t)S_2(t)=Xc$, $\Sigma S_i^*(t)n_j(t)=0$ and $|n_j(t)|^2 \approx 0$, the strength is expressed by:

$$\sum |X_1(t)|^2 = |h_{11}|^2 + |h_{21}|^2 + h_{11}h_{21}^*Xc^* + h_{11}^*h_{21}Xc \quad (4)$$
$$= |h_{11}|^2 + |h_{21}|^2 + 2\text{Re}[h_{11}h_{21}^*Xc^*]$$

When the transmitted signals $S_1(t)$ and $S_2(t)$ are equal to each other and in addition $h_{11}=-h_{21}$, the strength of received signals is zero, so that the AGC of the receiving apparatus 10b does not function accurately. Since Xc in the data interval becomes generally so small that it can be regarded as zero, the received power in the data interval becomes $|h_{11}|^2+|h_{22}|^2$. Hence, the difference in received power between a data interval and an STF interval is $2\text{Re}[h_{11}h_{21}^*Xc^*]$ as expressed by the third term on the right-hand side of Equation (4). This indicates that even in the case when $S_1(t)$ and $S_2(t)$ differs from each other, there is a large difference in power between the STF interval and the data interval if Xc in the STF interval is large, and consequently the AGC does not function normally. Therefore, an STF other than L-STF is required for a MIMO system and the cross-correlation between the required STF and L-STF needs to be low.

Figure 3A:
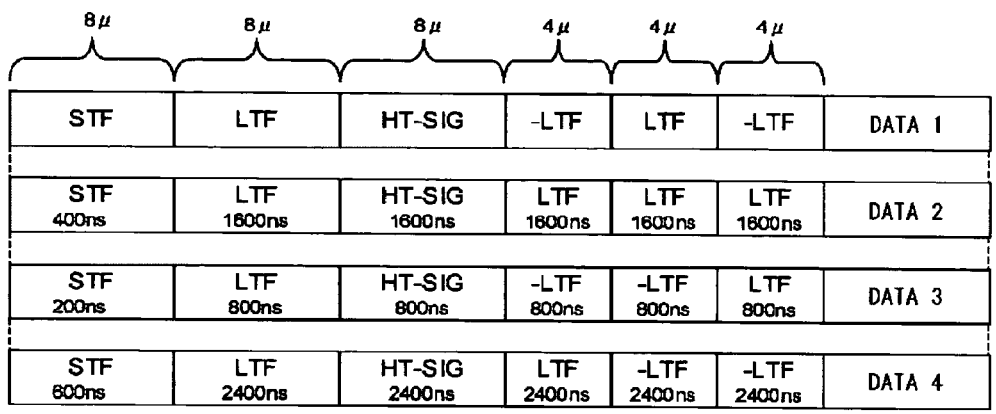
FIGS. 3A and 3B illustrate packet formats in a communication system shown in FIG. 2.
Figure 3B:
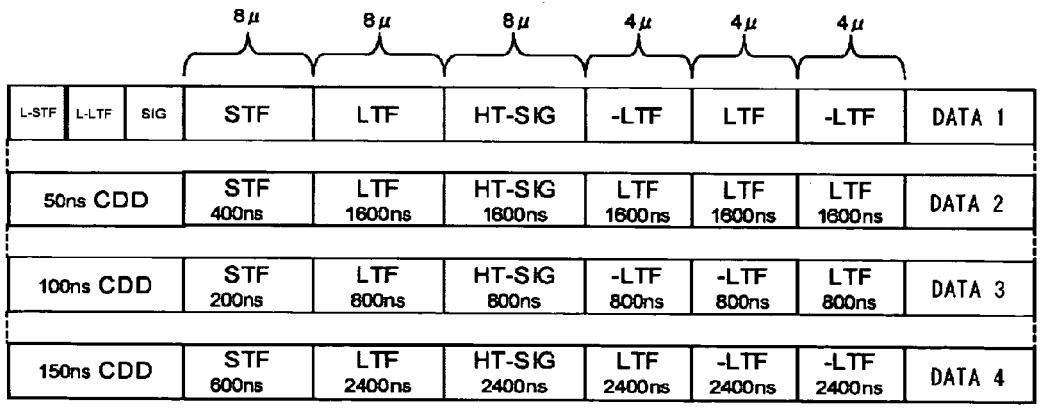

FIGS. 3A and 3B illustrate packet formats in a communication system 100. FIG. 3A shows a packet format in which a preamble signal compatible with a MIMO system is assigned in a header portion, and corresponds to the aforementioned first format. Assume herein that Data contained in four streams are to be transmitted and packet formats corresponding to the first to the fourth stream are shown in the order from the top to the bottom row. In a burst signal corresponding to the first stream, "STF", "LTF" and so forth are assigned as preamble signals (hereinafter SA-70255 STF and LTF are collectively referred to as "known signal"). In a burst signal corresponding to the second stream, "STF-400 ns", "LTF-1600 ns" and so forth are assigned as preambles. In a burst signal in the third stream, "STF-200 ns", "LTF-800 ns" and so forth are assigned as preambles. In a burst signal corresponding to the fourth stream, "STF-600 ns", "LTF-2400 ns" and so forth are assigned as preambles.

Here, "400 ns" and so forth represent shift amounts in CDD (Cyclic Delay Diversity). The CDD is a processing where in a predetermined interval a time-domain waveform is shifted, by a shift amount, in a posterior direction and then the waveform pushed out from the rearmost part in the predetermined interval is assigned cyclically in a header portion of the predetermined interval. CCD is expressed as C in the following Equation (5).

$$C(\lambda)=\text{dia}(1, \exp(-j2\pi\lambda\delta/N\text{out}), \Lambda, \exp(-j2\pi\lambda\delta(N\text{out}-1)/N\text{out})) \quad (5)$$

where δ indicates a shift amount. As shown in FIG. 3A, CCD is performed with a shift amount that differs for each stream. The inverse Fourier transform unit is defined to be 3.2 μs in LFT and HT-SIG described later, whereas the inverse Fourier transform unit is defined to be 0.8 μs in STF. Accordingly, the shift amount of the first stream is "0", the shift amount of the second stream is "inverse Fourier transform unit×1/2", the shift amount of the third stream is "inverse Fourier transform unit×1/4", and the shift amount of the fourth stream is "inverse Fourier transform unit×3/4". "HT-SIG" in a packet format corresponds to a control signal.

In the first stream, LTFs are placed in the order, from a front portion, of "LTF", "-LTF", "LTF" and "-LTF".

Hereinafter, those will be referred to as, in this order, "first component", "second component", "third component" and "fourth component" for each of the streams. If the operation of the first component minus (−) the second component plus (+) the third component minus (−) the fourth component is carried out on the received signals of all streams, a desired signal for the first stream is extracted in the receiving apparatus. If the operation of the first component+the second component+the third component+the fourth component is carried out on the received signals of all streams, a desired signal for the second stream is extracted in the receiving apparatus. If the operation of the first component−the second component−the third component+the fourth component is carried out on the received signals of all streams, a desired signal for the third stream is extracted in the receiving apparatus. If the operation of the first component+the second component −the third component−the fourth component is carried out on the received signals of all streams, a desired signal for the fourth stream is extracted in the receiving apparatus. This processing of addition and subtraction is done by a vector operation.

FIG. 3B shows a packet format in which a preamble signal compatible with a conventional system (hereinafter referred to as "legacy system") is further placed in front of the preamble signal compatible with a MIMO system. Here, preamble signals compatible with a legacy system are, as described above, represented as "L-STF" and "L-LTF" in the first stream, respectively. CDD with shift amounts of "50 ns", "100 ns" and "150 ns" is performed on the second to fourth streams. In FIG. 3B, STF and the subsequent ones are the same as the packet format of FIG. 3A.

Here, a burst format shown in either FIGS. 3A or 3B may be used. Since the burst format of FIG. 3A has less redundancy of signal components, the utilization efficiency can be improved. Since the preamble compatible with a legacy system is added in the burst format of FIG. 3B, the burst format of FIG. 3B can be detected by a legacy system, too.

Figure 4:
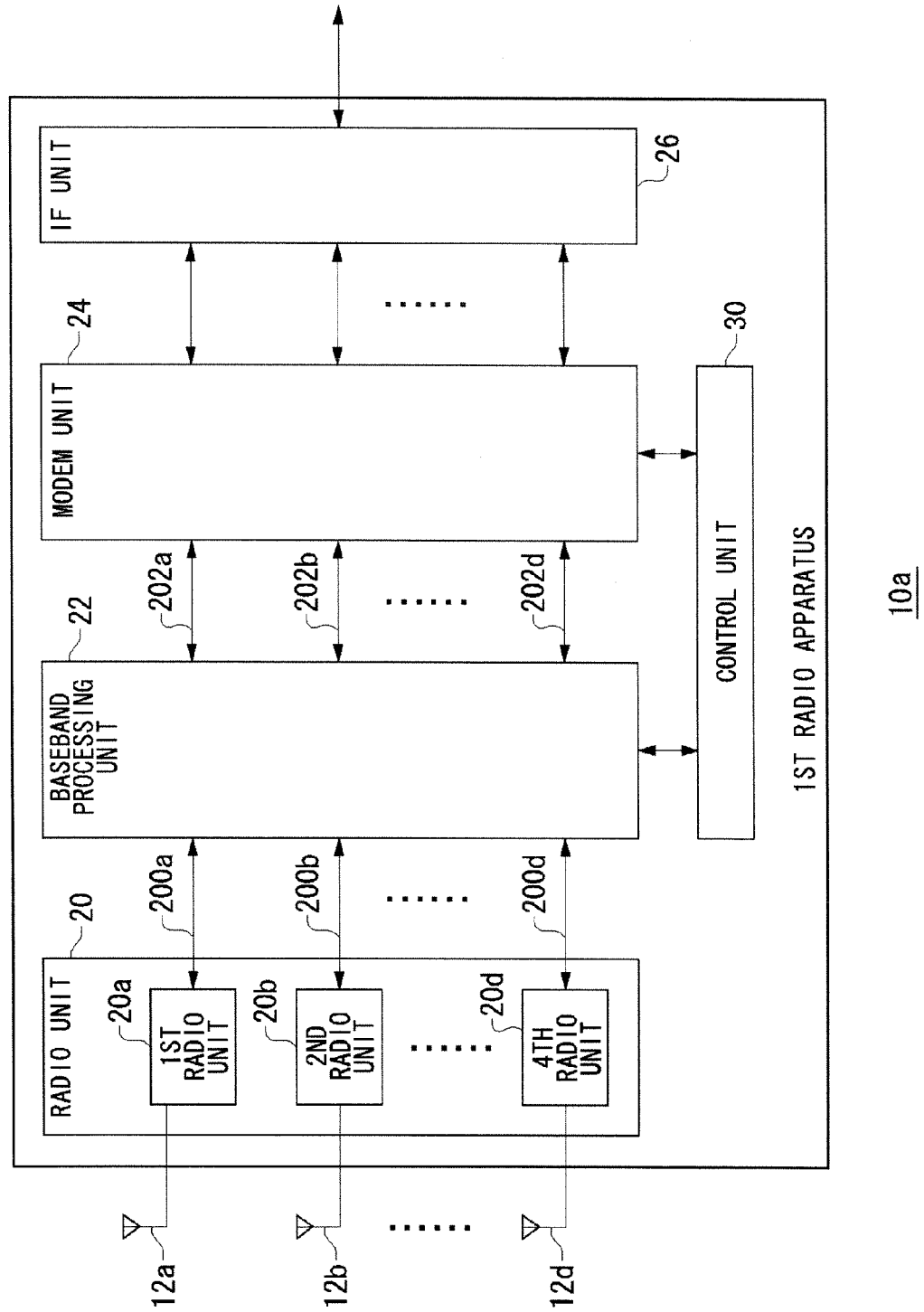
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b, and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. A PA (power amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted from the second radio apparatus 10b, not shown here. The baseband processing unit 22 also performs the operation of addition and subtraction on the first component and the like in the LTFs. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
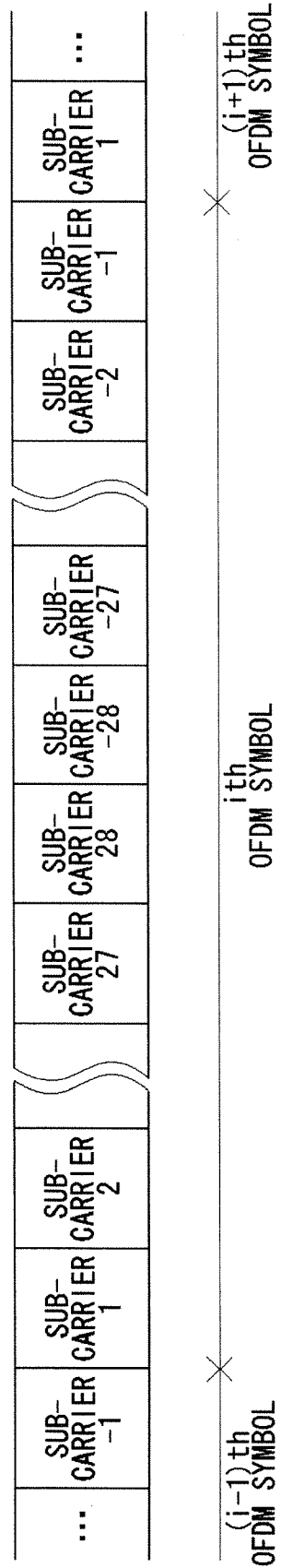
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarrier components are arranged in the order of subcarrier numbers "1" to "28" and subcarrier numbers "−28" to "−1". Assume also that an "(i-1)"th OFDM symbol is placed before the "i"th OFDM symbol, and an "(i+1)"th OFDM symbol is placed after the "i"th OFDM symbol.

Now refer back to FIG. 4. By implementing the structure described as above, the baseband processing unit 22 transmits a packet signal that uses a plurality of subcarriers, as a transmission processing. A packet signal is formed by a plurality of streams. Suppose here that the number of streams in a packet signal is four or less. As a receiving processing, on the other hand, the baseband processing unit 22 receives packet signals having the same format as the transmitted packet signals.

As a receiving processing, the modem unit 24 demodulates and decodes the frequency-domain signal 202 outputted from the baseband processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the baseband processing unit 22 as a frequency-domain signal 202. When the transmission processing is carried out, the modulation scheme and coding rate are specified by the control unit 30.

As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Then the IF unit 26 outputs the thus separated data to the plurality of modem units 24.

The control unit 30 controls the timing and the like of the first radio apparatus 10a. The control unit 30 also carries out processing for known signals contained in a packet signal to be transmitted and those contained in the received packet signal. Such processings correspond to a processing for generating packet signals having the packet formats shown in FIGS. 3A and 3B and a processing for extracting said packet signals.

As a transmission processing, the control unit 30 has the radio unit 20 and baseband processing unit 22 generate a packet signal to be transmitted. Here, either the aforementioned first format or second format is used as a packet signal. Selection criteria for selecting the first format or second format will be discussed later. As described earlier, the subcarriers to be used in STF contain those to be used in L-STF. Here, the same subcarriers as 12 subcarriers used in L-STF are used for STF. STF and L-STF are defined by different values. In particular, both STF and L-STF are defined by such values that cross-correlation therebetween becomes small. The control unit 30 assigns STF where a cyclic time shifting has been executed by varying the shift amount across a plurality of streams. As shown in FIGS. 3A and 3B, the shift amount is defined to be "200 ns" and so forth.

The control unit 30 assigns LTFs respectively in packet signals of multiple streams. Here, as described earlier, LTFs undergo CDD by shift amounts of "0", "inverse Fourier transform unit×1/2", "inverse Fourier transform unit×1/4", and "inverse Fourier transform unit×3/4", respectively. Such shifts in the time domain correspond to the phase rotation in the frequency domain, namely, in units of subcarriers. More specifically, the rotation amount is determined in a manner such that an integral multiple of a predetermined value is multiplied across subcarriers to be used by LTF. If the phase value is "π/2", the rotation amount is determined to be "0", "π/2", "π", "π/2", "0" and the like as the subcarrier number increases.

While rotating, by such rotation values as above, the value of LTF in one of a plurality of streams, known signals in the other streams are defined. For example, if LFT in one of a plurality of streams is defined to be "1", "1", "1", "1" and "1" as the subcarrier number increases, LTF in the other streams is defined to be, for example, "1", "j", "−1", "−j" and "1" by the aforementioned rotation values. If the phase value is "π" or "π/2", the similar processing will be carried out. As another example, if the first stream is represented in such a manner as "0", "a", "b", "c", "d" and "e", the second stream will be represented as "0", "a×π", "b×2π", "c×3π", "d×4π" and "e×5π". Then the third stream will be represented as "0", "a×1/2π", "b×2/2π", "c×3/2π", "d×4/2π" and "e×5/2π". The fifth stream will be represented as "0", "a×3/2π", "33 6/2π", "c×9/2π", "d×12/2π" and "e×15/2π". Here the shift amounts of "0", "inverse Fourier transform unit×1/2", "inverse Fourier transform unit×1/4", and "inverse Fourier transform unit×3/4" correspond to the phase values of "0", "π/2", "π" and "3π/2", respectively.

Since the rotation based on the phase values of "π/2", "π" and "3π/2" is achieved by the exchange between in-phase component and quadrature component and the sign inversion, complex multiplication is skipped. As a result, the processing can be simplified. In the control unit 30, the phase value for a stream is so defined as to be identical for both STF and LTF. In other words, the rotation amount for STF and LTF is obtained by multiplying subcarriers having effective values by an integral multiple of a phase value. Here, "subcarriers having effective values" correspond to contiguous subcarriers for LTF and correspond to subcarriers every four STFs. In FIG. 3A, the shift amounts for STF and LTF for each stream differ. Nevertheless, the inverse Fourier transmit unit for STF differs also from that for LTF. As a result, the "shift amount per inverse Fourier transform unit" is equal in both STF and LTF, and the phase value will be equal in both STF and LTF.

As a receiving processing, the control unit 30 computes correlation between the received packet signal and STF and then outputs a first correlation value, and computes correlation between the received packet signal and L-STF and then outputs a second correlation value. In the above processing, the received packet signal corresponds to the time-domain signal 200. That is, the control unit 30 computes the above correlations in the time domain. Based on the first correlation value and second correlation value, the control unit 30 specifies whether the packet format used in the received packet signal is the first format or second format. More specifically, if the first correlation value is greater than the second correlation value, it will be identified that the received packet signal is the first format. If otherwise, it will be identified that the received packet signal is the second format. If, as a result of the above processing performed on a plurality of packet signals, no packet signals of the second format has been received, the control unit 30 judges that in the vicinity thereof there does not exist any radio apparatus 10 compatible with a legacy system alone, and determines that the packet signals of the first format be used for transmission.

The control unit 30 outputs instructions for adaptive array signal processing in the baseband processing unit 22. The baseband processing unit 22 derives, from packet signals of a plurality of streams and LTF, channel characteristics, corresponding respectively to the plurality of streams, in the frequency domain for each subcarrier. In other words, the baseband processing unit 22 derives channel characteristics corresponding respectively to the first to the fourth stream of FIG. 3A. For example, since CDD with a shift amount of 1600 ns is performed on the second stream, the channel characteristic shifted by 1600 ns from the actual channel characteristic is derived from between the received packet signal and LTF. Since, on the other hand, CDD is not performed on data of second stream, the derived channel characteristic does not correspond to the data. Thus, the baseband processing unit 22 performs a processing to restore the shift amount in CDD, on the derived channel characteristic. For example, the above processing corresponding to the rotation per subcarrier is carried out. In order to realize the above processing, the control unit 30 instructs the baseband processing unit 22 to execute the processing to restore the shift amount. Finally, the baseband processing unit 22 demodulates respectively the data assigned in the packet signals of a plurality of streams, with the thus restored channel characteristic.

In terms of hardware, this structure can be realized by a CPU, a memory and other LSIs of an arbitrary computer. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 6:
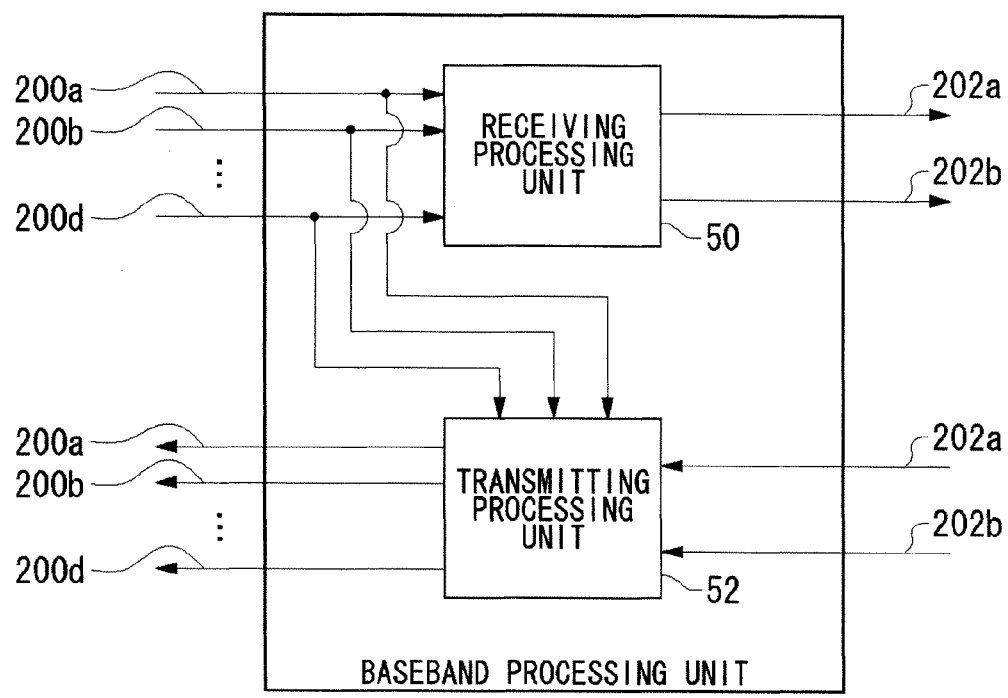
FIG. 6 illustrates a structure of a baseband processing unit shown in FIG. 4.

FIG. 6 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives the channel characteristics in the frequency domain and derives receiving weight vectors. Then the receiving processing unit 50 outputs the result of array synthesis as the frequency-domain signal 202.

A processing of receiving processing unit 50 will now be described in a specific manner. The receiving processing unit 50 inputs a plurality of time-domain signals 200 and then performs Fourier transform on them, respectively, so as to derive frequency-domain signals. As described earlier, a frequency-domain signal is such that signals corresponding to subcarriers are arranged serially in the order of subcarrier numbers.

The receiving processing unit 50 weights the frequency-domain signals with receiving weight vectors, and a plurality of weighted signals are summed up. Since the frequency-domain signal is composed of a plurality of subcarriers, the above processing is also executed on a subcarrier-by-subcarrier basis. As a result, the signals summed up are also arranged serially, as shown in FIG. 5, in the order of subcarrier numbers. The signals summed up are the aforementioned frequency-domain signals 202.

The receiving processing unit 50 derives channel characteristics based on a correlation processing. Here, receiving response vectors are derived as the channel characteristics. If a frequency-domain signal corresponding to the first time-domain signal 200a is denoted by $x_1(t)$, a frequency-domain signal corresponding to the second time-domain signal 200b by $x_2(t)$, a reference signal in the first stream by $S_1(t)$ and a reference signal in the second stream by $S_2(t)$, then $x_1(t)$ and $x_2(t)$ will be expressed by the following Equation (6):

$$x_1(t)=h_{11}S_1(t)+h_{21}S_2(t)$$

$$x_2(t)=h_{12}S_1(t)+h_{22}S_2(t) \tag{6}$$

The noise is ignored here. A first correlation matrix $R_1$, with E as an ensemble average, is expressed by the following Equation (7):

$$R_1 = \begin{bmatrix} E[x_1 S_1^*] & E[x_1 S_2^*] \\ E[x_2 S_1^*] & E[x_2 S_2^*] \end{bmatrix} \tag{7}$$

A second correlation matrix $R_2$ among the reference signals is given by the following Equation (8):

$$R_2 = \begin{bmatrix} E[S_1 S_1^*] & E[S_1 S_2^*] \\ E[S_2 S_1^*] & E[S_2 S_2^*] \end{bmatrix} \tag{8}$$

Finally, the first correlation matrix $R_1$ is multiplied by the inverse matrix of the second correlation matrix $R_2$ so as to derive a receiving response vector, which is expressed by the following Equation (9):

$$\begin{bmatrix} h_{11} & h_{21} \\ h_{12} & h_{22} \end{bmatrix} = R_1 R_2^{-1} \qquad (9)$$

Then the receiving processing unit 50 computes a receiving weight vector from the receiving response vector. In accordance with an instruction from the control unit 30, the receiving processing unit 50 carries out, per subcarrier, phase rotation to restore CDD performed on the receiving response vector.

The transmitting processing unit 52 executes a part, corresponding to a transmission operation, of operations by the baseband processing unit 22. That is, the receiving processing unit 50 associates the frequency-domain signals 202 respectively with the time-domain signals 200 and vice versa. For the sake of simplicity, they are associated in a manner of one-to-one correspondence. The receiving processing unit 50 carries out the selection of packet formats and the addition of known signals.

According to the present embodiment, the values of L-STF and LTF are respectively defined in a manner such that the correlation between L-STF and LTF is small. As a result, packet formats can be detected by correlation processing. Since packet formats can be automatically detected, the control signal therefor is no longer necessary. Since the use of such a control signal is eliminated, the transmission efficiency can be improved. Since all available subcarriers can be used for L-STF and STF, the autocorrelations of both L-STF and STF can be raised and the detection accuracy can be improved. Since CDD is performed by varying the shift amount when L-STF and STF are assigned in a plurality of streams, the correlation among a plurality streams can be lowered.

Since LTF assigned in one stream is rotated and the phase value to form the basis of the rotation amount is set to the interval of π/2, the use of complex multipliers can be eliminated. Since the complex multiplier is no longer necessary, the processing can be simplified. Since the phase values to form the basis of rotation amounts are set to the same value for both STF and LTF in one stream, the processing can be simplified. The channel characteristic derived in LTF is rotated and the thus rotated channel characteristic is used to demodulate data. Thus, CDD is performed on LTF contained in one stream. Hence, even if data has not been subjected to CDD, said data can be demodulated.

The present invention has been described based on the embodiments which are only exemplary. It is therefore understood by those skilled in the art that other various modifications to the combination of each component and process are possible and that such modifications are also within the scope of the present invention.

According to the present embodiment, the control unit 30 defines in a manner such that subcarriers to be used for L-STF are the same as those to be used for STF and vice verse. However, the structure is not limited thereto and, for example, subcarriers other than the subcarriers to be used for L-STF may be contained in the subcarriers to be used for STF. As described earlier, twelve subcarriers are used, for L-STF, among the subcarriers numbers "−26" to "26". On the other hand, in addition to these twelve subcarriers, two out of subcarrier numbers "−28" to "−26" and "26" to "28" may be also used for L-STF so as to use the total of fourteen subcarriers. Also, both "−28" and "28" or either one may be used. According to this modification, the number of subcarriers to be used is increased, so that deterioration of the accuracy of setting AGC can be prevented even in a frequency selective fading environment.

While the preferred embodiments of the present invention have been described using specific terms, such description is for illustrative purposes only, and it is to be understood that changes and variations may be made without departing from the spirit or scope of the appended claims.

What is claimed is:

1. A radio terminal apparatus comprising:
   a receiver configured to receive a packet signal formed by a plurality of streams modulating a plurality of subcarriers in predetermined bandwidths, said packet signal being in either a first packet format or a second packet format,
   the first packet format including first legacy known signals for a first radio communication system different from a second radio communication system, second legacy known signals for the first radio communication system, and first MIMO known signals for the second radio communication system, the first legacy known signals, the second legacy known signals, and the first MIMO known signals being arranged in that order,
   the second packet format including second MIMO known signals for the second radio communication system and the first MIMO known signals, the second MIMO known signals and the first MIMO known signals being arranged in that order, no first and second legacy known signals being included in the second packet format;
   an ACG (auto gain control) estimation module configured for performing ACG estimation based on said first legacy known signals or said second MIMO known signals;
   a channel estimation module configured for performing channel estimation based on said second legacy known signals or said first MIMO known signals;
   wherein subcarriers for the first MIMO known signals have a bandwidth which has the same center frequency as that of subcarriers for the second legacy known signals and which is broader than that of subcarriers for the second legacy known signals,
   wherein said first and second legacy known signals and said first and second MIMO known signals are generated by execution of a cyclic time shifting with shift amounts being varied across the plurality of streams,
   a maximum absolute shift amount among absolute shift amounts for the first MIMO known signals in the plurality of streams is greater than absolute shift amounts for the second legacy known signals in the plurality of streams, and
   a maximum absolute shift amount among absolute shift amounts for the second MIMO known signals in the plurality of streams is greater than absolute shift amounts for the first legacy known signals in the plurality of streams.

2. The radio apparatus according to claim 1, wherein said first MIMO known signals and the second legacy known signals are defined so that correlation therebetween is lower that a determined threshold.

3. The radio apparatus according to claim 1, wherein the subcarriers to be used in the first MIMO known signals contain subcarriers other than the subcarriers to be used in the second legacy known signals.

4. A radio terminal apparatus comprising:
   a receiver configured for receiving a packet signal formed by a plurality of streams modulating a plurality of subcarriers in predetermined bandwidths, said packet signal being in a packet format including first legacy known signals for a first radio communication system different from a second radio communication system, second legacy known signals for the first radio communication system, and MIMO known signals for the second radio communication system, the first legacy known signals, the second legacy known signals, and the MIMO known signals being arranged in that order, an ACG (auto gain control) estimation module configured for performing ACG estimation based on said first legacy known signals, a channel estimation module configured for performing channel estimation based on said second legacy known signals and said MIMO known signals, wherein subcarriers for the MIMO known signals have a bandwidth which has the same center frequency as that of subcarriers for the second legacy known signals and which is broader than that of subcarriers for the second legacy known signals, wherein said MIMO known signals and said first and second legacy known signals are generated by execution of a cyclic time shifting with shift amounts being varied across the plurality of streams, a maximum absolute shift amount among absolute shift amounts for the MIMO known signals in the plurality of streams is greater than that among absolute shift amounts for the second legacy known signals in the plurality of streams, and a maximum absolute shift amount among absolute shift amounts for the first legacy known signals in the plurality of streams is equal to that among absolute shift amounts for the second legacy known signals in the plurality of streams.

5. A radio terminal apparatus comprising:

a receiver configured to receive a packet signal formed by a plurality of streams modulating a plurality of subcarriers in predetermined bandwidths, said packet signal being in either a first packet format or a second packet format, the first packet format including first legacy known signals for a first radio communication system different from a second radio communication system, second legacy known signals for the first radio communication system, and first MIMO known signals for the second radio communication system, the first legacy known signals, the second legacy known signals, and the first MIMO known signals being arranged in that order, the second packet format including second MIMO known signals for the second radio communication system and the first MIMO known signals, the second MIMO known signals and the first MIMO known signals being arranged in that order, no first and second legacy known signals being included in the second packet format;

an ACG (auto gain control) estimation module configured for performing ACG estimation based on said first legacy known signals and said second MIMO known signals;

a channel estimation module configured for performing channel estimation based on said second legacy known signals and said first MIMO known signals;

wherein subcarriers for the first MIMO known signals have a bandwidth which has the same center frequency as that of subcarriers for the second legacy known signals and which is broader than that of subcarriers for the second legacy known signals, wherein said first and second legacy known signals and said first and second MIMO known signals are generated by execution of a cyclic time shifting with shift amounts being varied across the plurality of streams, a maximum absolute shift amount among absolute shift amounts for the first MIMO known signals in the plurality of streams is greater than absolute shift amounts for the second legacy known signals in the plurality of streams, and a maximum absolute shift amount among absolute shift amounts for the second MIMO known signals in the plurality of streams is greater than absolute shift amounts for the first legacy known signals in the plurality of streams.

* * * * *